March 3, 1931. H. MOLLY 1,795,135
GEAR
Filed Feb. 12, 1930
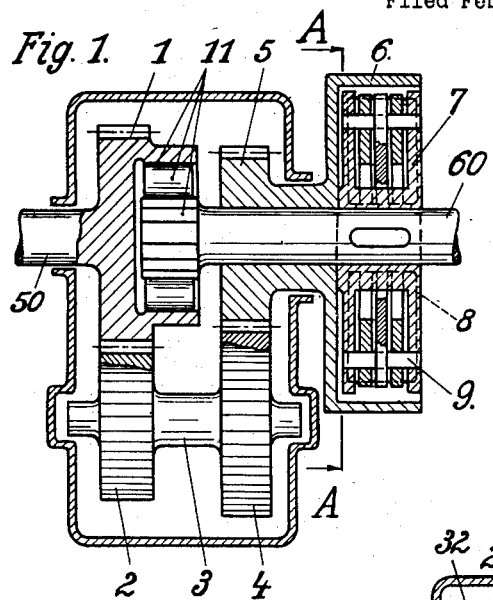
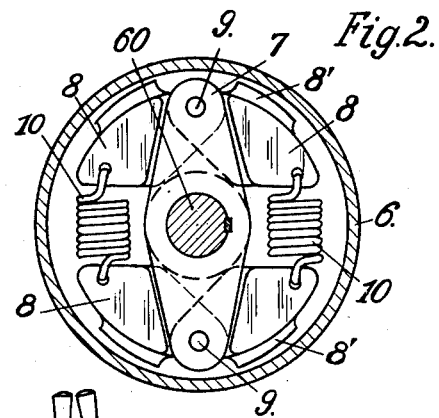
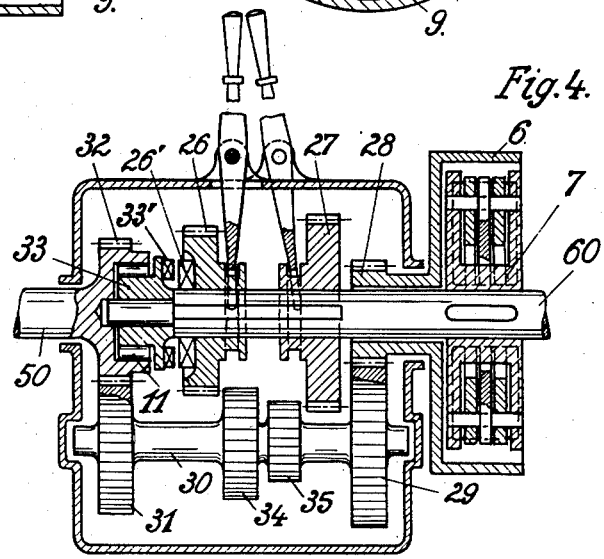
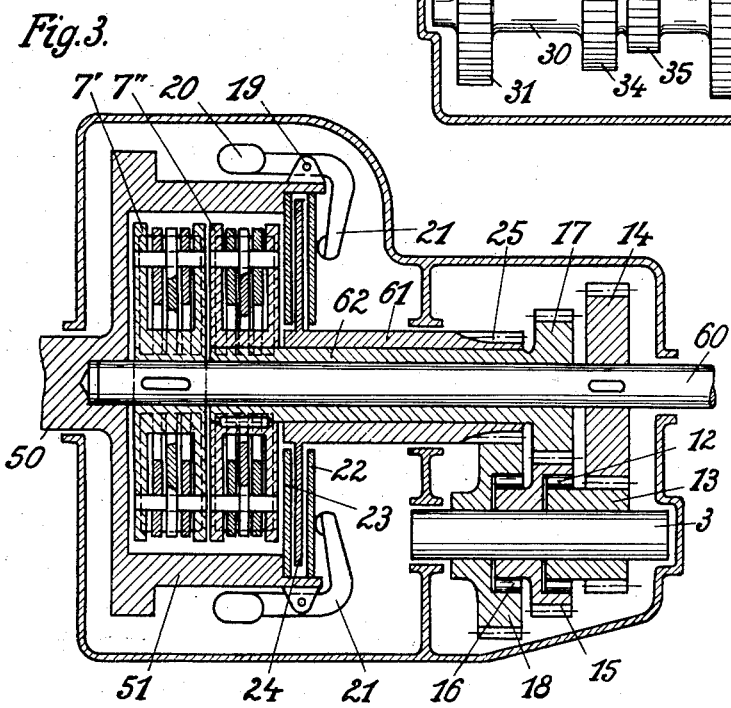
Inventor:
Hans Molly Patented Mar. 3, 1931

1,795,135

UNITED STATES PATENT OFFICE

HANS MOLLY, OF FRIEDRICHSHAFEN, GERMANY, ASSIGNOR TO ZAHNRADFABRIK AK-TIENGESELLSCHAFT, OF FRIEDRICHSHAFEN, GERMANY

GEAR

Application filed February 12, 1930, Serial No. 427,887, and in Germany March 4, 1929.

My invention relates to gears and has special reference to gears in motor vehicles such as automobiles and the like.

The main object of my invention is to provide for automatic change in gear dependent on the speed of the vehicle or on the number of revolutions of the gear shaft which transmits the driving force to the rear axle.

Another object is to provide for a simple and effective construction, which may be used as an automatic change speed gear needing no manual operation for perfecting the change in gear, but which may also be combined with ordinary change speed gears. In this latter case, a certain number of speeds may be provided for automatic change, whereas the additional speeds are set in the usual way by operating a lever or the like.

Other objects and advantages will appear in the course of the following description.

The drawings represent examples embodying my invention.

Fig. 1 is a longitudinal section through a two-speed gear, the lower stub shaft being shown in side view. Fig. 2 represents a cross section through the centrifugal clutch of Fig. 1 taken on line A—A thereof.

Fig. 3 shows another example with three speeds, in longitudinal section.

The example represented in Fig. 4 is a combination of automatic change in speed according to the invention, with an ordinary operated change speed gear.

The driving shaft is indicated at 50, the driven shaft at 60, referring to all four figures.

In Fig. 1 there is a gear 1 rigidly connected to the driving shaft 50. It meshes with a gear 2 rigidly fixed to the stub shaft 3 which has a second gear 4 also rigidly fixed thereto. This gear 4 meshes with a gear 5 loosely mounted on the driven shaft 60. Gear 5 has an extension 6 which is formed into a circular rim surrounding and forming part of a centrifugal clutch rigidly fixed to shaft 60. The forward end of shaft 60 is journaled in a recess or gear 1 by means of rollers 11 which together with the surrounding rim of gear 1 and the adequately shaped end of shaft 60 constitute a one-way clutch, or free-wheel mechanism.

The carrier 7 rigidly connected to the driven shaft 60 bears weights 8 journaled at 9 adapted to swing outwardly on rotation of shaft 60. The centrifugal movement of these weights 8 is controlled by means of springs 10. There are friction pads 8' provided on weights 8 which rub against the inner circumference of rim 6 as soon as the number of revolutions of shaft 60 suffices to overcome the resistance of springs 10. Thus the clutching between shaft 60 and gear 5 is dependent on the velocity of shaft 60.

According to the gear dimensions chosen shaft 50 always runs slower than gear 5 and rim 6. One-way clutch 11 connects gear 1 and shaft 50 with shaft 60 in such manner that shaft 50 drives shaft 60, but as soon as shaft 60 overruns shaft 50 the clutch 11 disconnects. Constructions of this kind of one-way clutches are well-known to those skilled in the art. This overrunning of shaft 60 over the velocity of revolution of shaft 50 will occur as soon as the number of revolutions of shaft 60 has so increased that the centrifugal clutch between carrier 7 and rim 6 catches and connects shaft 60 with gear 5, thus causing shaft 60 to run faster than shaft 50. As soon as the resistance offered to the vehicle causes it to run slower, so slow that the abolute speed of revolution of shaft 60 does not suffice any more for the centrifugal clutch to keep up frictional connection between rim 6 and pads 8', then this clutch disengages and automatically one-way clutch 11 comes into action again.

Thus, in accordance with the speed of the vehicle or with the resistance it has to overcome, the gear ratio changes automatically.

This principle as explained in connection with the first and simplest example is also applicable to any change speed gear having more speed changes or transmission ratios than only two. In Fig. 3 an example is shown with 3 speeds.

To the driving shaft 50 a drum-like element 51 is rigidly connected forming part of three individual centrifugal clutches. The driven shaft 60 has a carrier 7' rigidly connected thereto. This carrier and its supplemental parts and also the second carrier 7″ are constructed in accordance with Fig. 2. There is a third clutch provided for operation by centrifugal forces; its component parts are two friction discs 22 and 23, which are rigidly connected to drum 51, an intermediate friction disc 24 connected to a hollow shaft 61 and levers 21 pivoted at 19 to the drum 51 and having weights 20 at one end whereas the other end is adapted to press the discs 22, 23 and 24 against each other thereby causing the hollow shaft 61 to rotate together with drum 51 and driving shaft 50 as soon as the centrifugal weights 20 swing outwardly because of rotation of shaft 50. Consequently this friction clutch 22, 23, 24 constitutes an ideal starting coupling which provides for a gentle and shockless automatic start of the vehicle. Hollow shaft 61 at its right hand end is shaped into a pinion 25 meshing with gear 18 loosely mounted on stub shaft 3. The rotation of gear 18 by means of a one-way clutch 16 (of usual roller construction or the like) is transmitted to gear 15 and therefrom again to gear 13 by means of one-way clutch 12. Gear 13 meshes with gear 14 which is rigidly connected to driven shaft 60.

Gear 15 meshing with gear 17 which forms the right hand end of hollow shaft 62 causes carrier 7″ to rotate faster than shaft 60, because of the chosen gear ratio. Consequently the centrifugal clutch between 7″ and drum 51 will seize as soon as the adequate number of revolutions of carrier 7″ is attained. Then the driving force goes through this clutch, is transmitted to gears 17 and 15, passes through one-way clutch 12 and by means of gears 13 and 14 drives shaft 60. One-way clutch 16 is then out of action, that means it runs free, because gear 15 now overruns gear 18. Shaft 60 is now driven at its second speed.

On further increase of rotation of this shaft, which is equal to a decrease in resistance offered thereto, centrifugal clutch 7′, directly connected to shaft 60, will seize to drum 51 and cause direct connection between shaft 50 and shaft 60. Then free-wheel clutch 12 will also run free, because gear 13 now overruns gear 15.

As soon as shaft 60 for some reason or other slows down again, the centrifugal clutches, one after the other, disconnect and the free-wheel clutches come into action again. Thus, in this example also, the gear ratio changes automatically in dependency on the speed of the vehicle.

A further example for application of my invention is shown in Fig. 4. This represents a combination of my automatic speed change with an ordinary change speed gear working by shifting the gear wheels.

The incoming shaft is again indicated at 50, whereas 60 is the outcoming shaft. There is a stub shaft 30 with gears 31, 34, 35 and 29 rigidly fixed thereto. Gear 31 meshes with gear 32, rigidly fixed to shaft 50. Gears 26 and 27 are splined to shaft 60 and can be shifted thereon as to come in or out of engagement with the corresponding gears 34 and 35, respectively, on shaft 30. There is a one-way clutch 11 provided between gear 32 and member 33. This latter member by means of claws 33′ and 26′ can be connected to gear 26 on adequate shifting thereof, thus transmitting rotation directly from shaft 50 to shaft 60. A centrifugal clutch is provided at the right hand end of the entire gear mechanism, centrifugal weight carrier 7 being rigidly connected to shaft 60 and drum 6 being in rigid connection with gear 28, which meshes with gear 29 on stub shaft 30.

It will easily be seen that this kind of gear mechanism serves for choosing the first three speeds at will, whereas the fourth speed—or when going backwards, the third speed—engage automatically.

I do not want to be limited to the examples and details described in the specification or shown in the drawings, as many variations will occur to those skilled in the art.

What I claim is:

A change speed gear comprising a driving shaft, a driven shaft, transmitting means for rotating said driven shaft from said driving shaft at a slow speed, means for directly coupling said driving shaft to said driven shaft, transmitting means for rotating said driven shaft faster than said driving shaft, a centrifugal clutch fixed to said driven shaft and adapted on sufficient speed of rotation to cause operative connection between said faster transmitting means and said driven shaft, and a one way clutch between said driving shaft and said direct coupling means, said one way clutch being adapted to transmit rotation from said driving shaft to said direct coupling means but allowing for said coupling means to overrun said driving shaft.

HANS MOLLY.

CERTIFICATE OF CORRECTION.

Patent No. 1,795,135.  March 3, 1931.

HANS MOLLY.

It is hereby certified that error appears in the printed specification of the above numbered patent requiring correction as follows: Page 2, line 98, in the claim, for the word "slow" read slower; and that the said Letters Patent should be read with this correction therein that the same may conform to the record of the case in the Patent Office.

Signed and sealed this 8th day of December, A. D. 1936.

Henry Van Arsdale (Seal)    Acting Commissioner of Patents.